United States Patent
Ito

(10) Patent No.: US 9,160,919 B2
(45) Date of Patent: Oct. 13, 2015

(54) FOCUS ADJUSTMENT UNIT AND CAMERA SYSTEM

(71) Applicant: Olympus Imaging Corp., Shibuya-ku, Tokyo (JP)

(72) Inventor: Satoru Ito, Komae (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/157,341

(22) Filed: Jan. 16, 2014

(65) Prior Publication Data

US 2014/0204266 A1      Jul. 24, 2014

(30) Foreign Application Priority Data

Jan. 18, 2013   (JP) ................................. 2013-007796

(51) Int. Cl.
*H04N 5/232* (2006.01)
*G03B 13/00* (2006.01)

(52) U.S. Cl.
CPC ....... *H04N 5/23212* (2013.01); *H04N 5/23209* (2013.01); *H04N 5/23296* (2013.01)

(58) Field of Classification Search
CPC ............................ H04N 5/23212; G03B 13/36
USPC ......... 348/345, 347, 349, 352, 353, 354, 355, 348/356; 396/79–82, 124
See application file for complete search history.

(56) References Cited

U.S. PATENT DOCUMENTS

| 5,031,049 A * | 7/1991 | Toyama et al. ............... 348/352 |
| 5,128,768 A * | 7/1992 | Suda et al. .................... 348/352 |
| 5,629,735 A * | 5/1997 | Kaneda et al. ................ 348/350 |
| 2009/0244325 A1 * | 10/2009 | Honjo et al. ............. 348/231.99 |

FOREIGN PATENT DOCUMENTS

JP          2005-025118        1/2005

* cited by examiner

*Primary Examiner* — Lin Ye
*Assistant Examiner* — Chriss Yoder, III
(74) *Attorney, Agent, or Firm* — John C. Pokotylo; Straub & Pokotylo

(57) ABSTRACT

A focus adjustment unit according to the present invention has an imaging section configured to generate an image signal by forming and capturing an optical image on an image sensor by an optical system including a focusing lens, and performs focus adjustment based on a focus detection signal relating to a focus detection area set within an imaging area, the focus adjustment unit comprising a focusing lens position detection section configured to detect a position of the focusing lens, a storage section configured to store information on an image magnification change of the optical system along with movement of the focusing lens, and a focus detection area setting section configured to set a focus detection area within the imaging area, wherein the focus detection area setting section sets the focus detection area based on the position of the focusing lens and the information on an image magnification change.

10 Claims, 8 Drawing Sheets

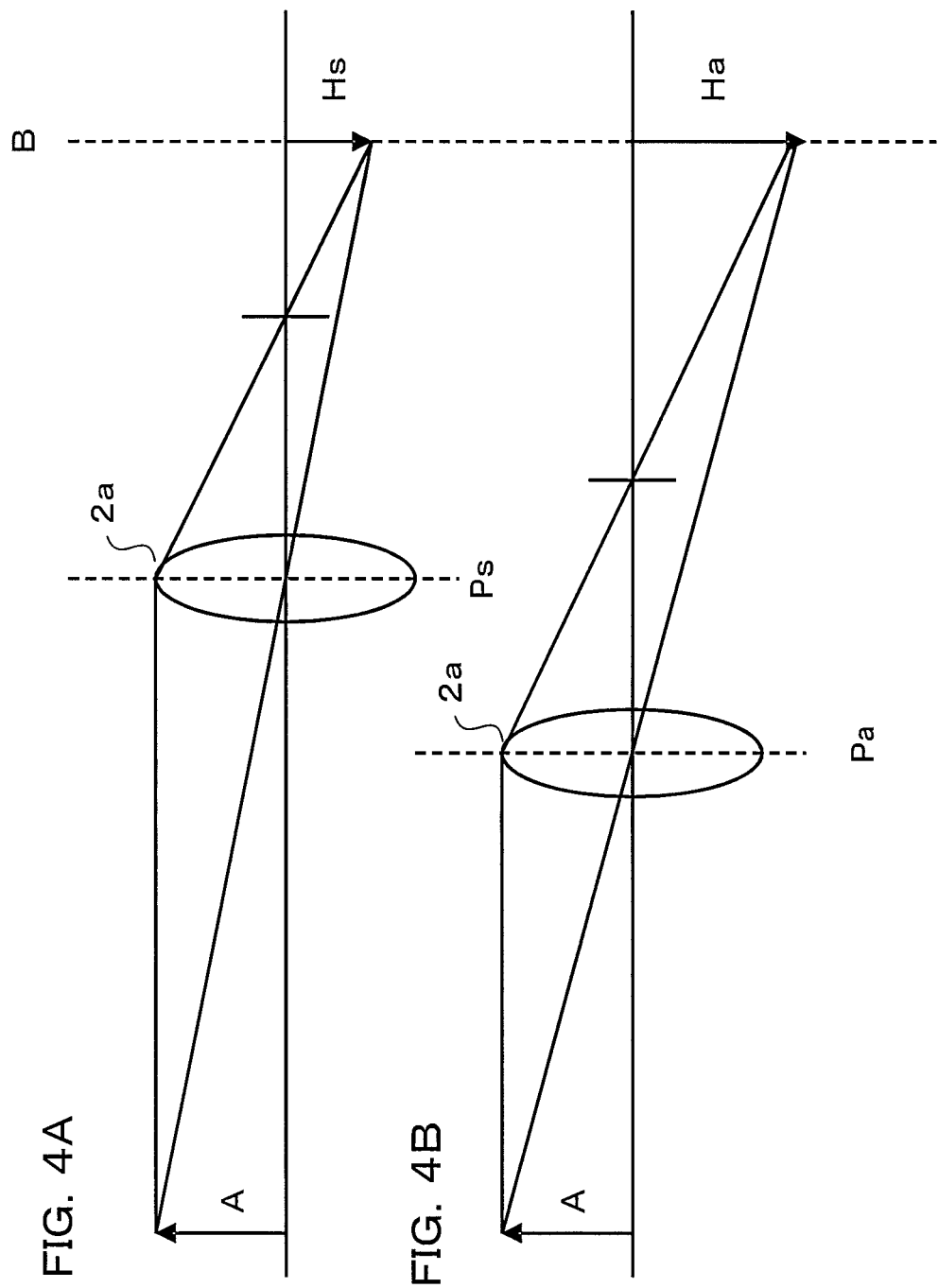

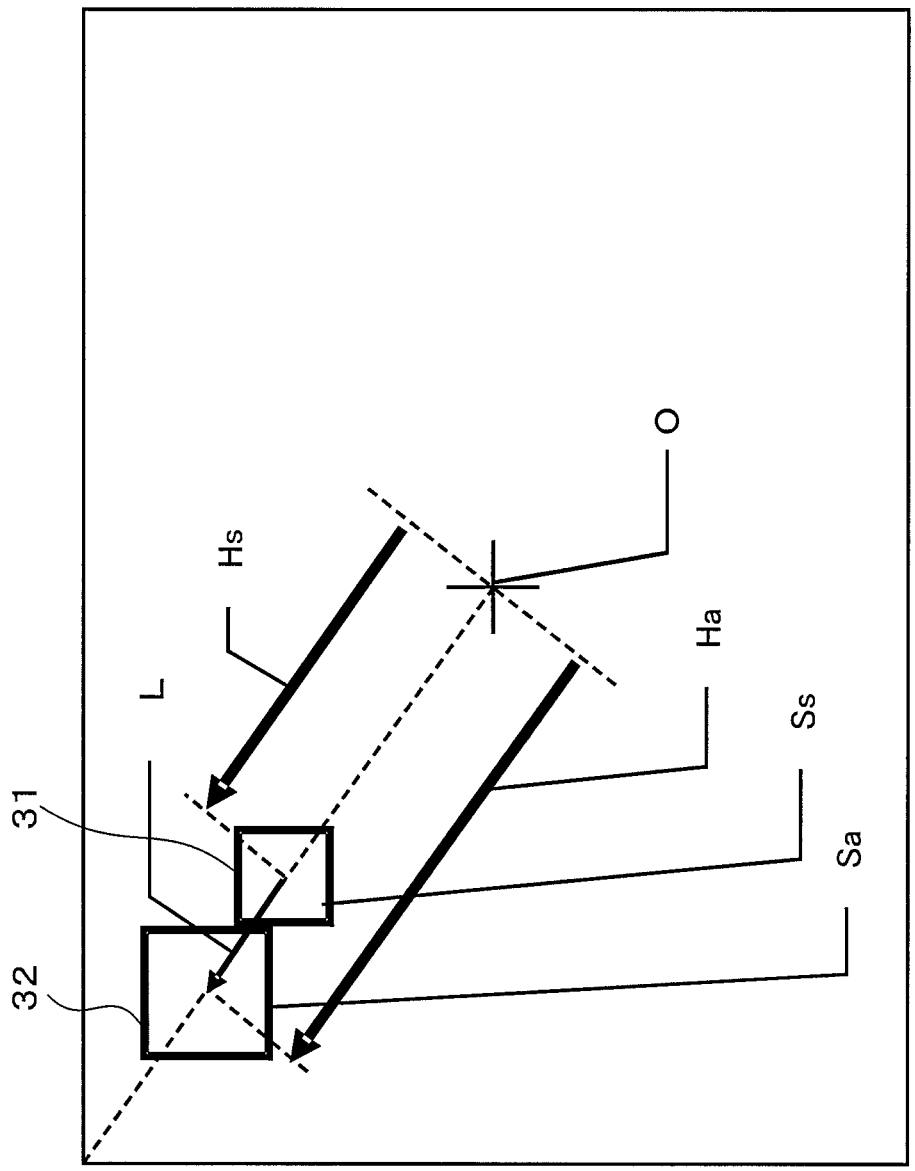

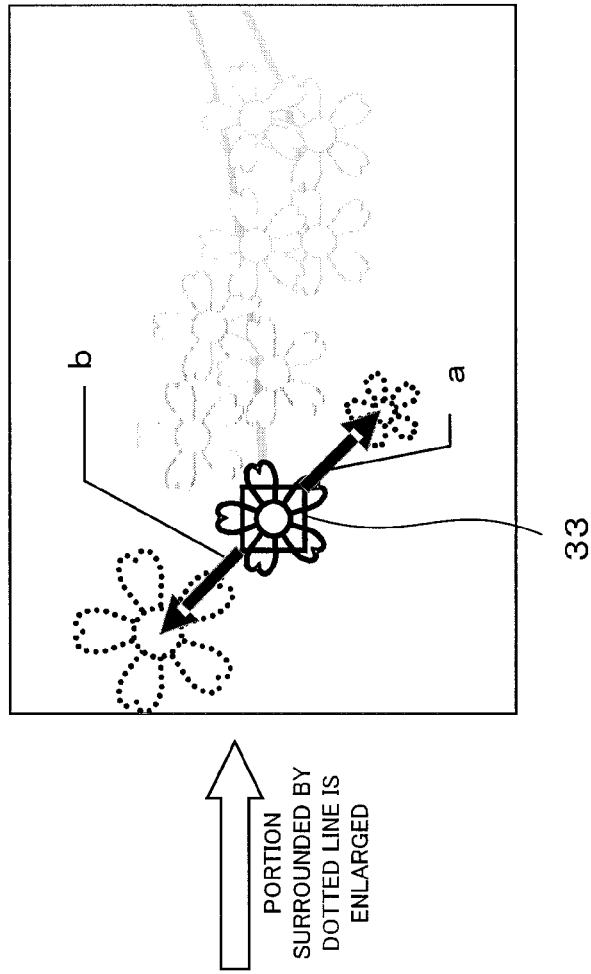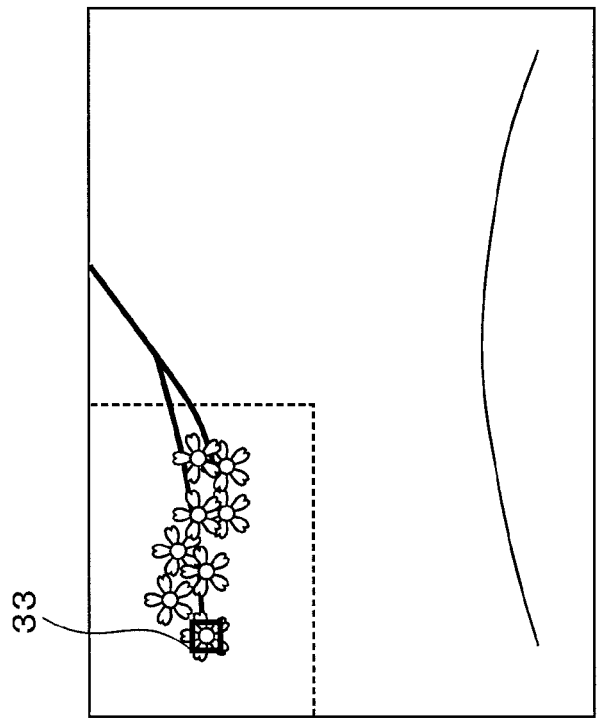

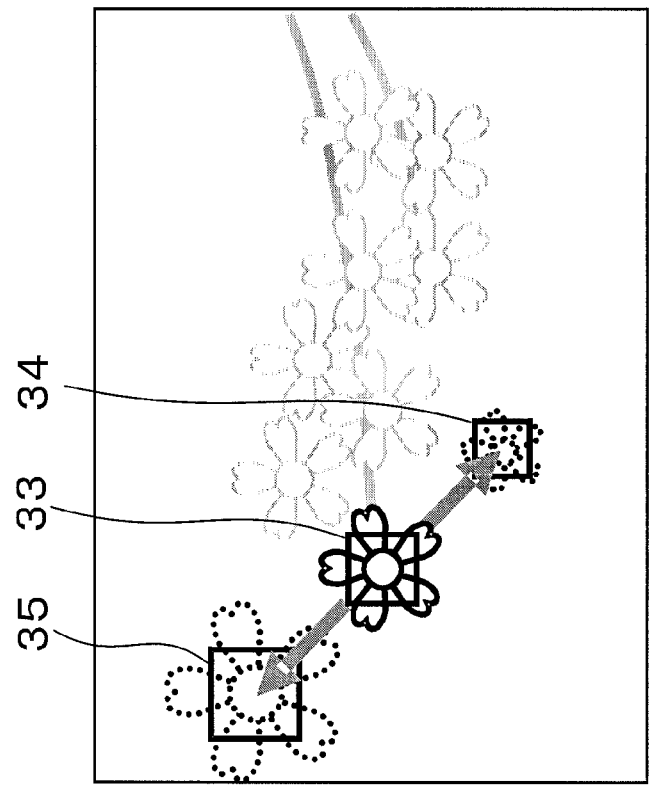
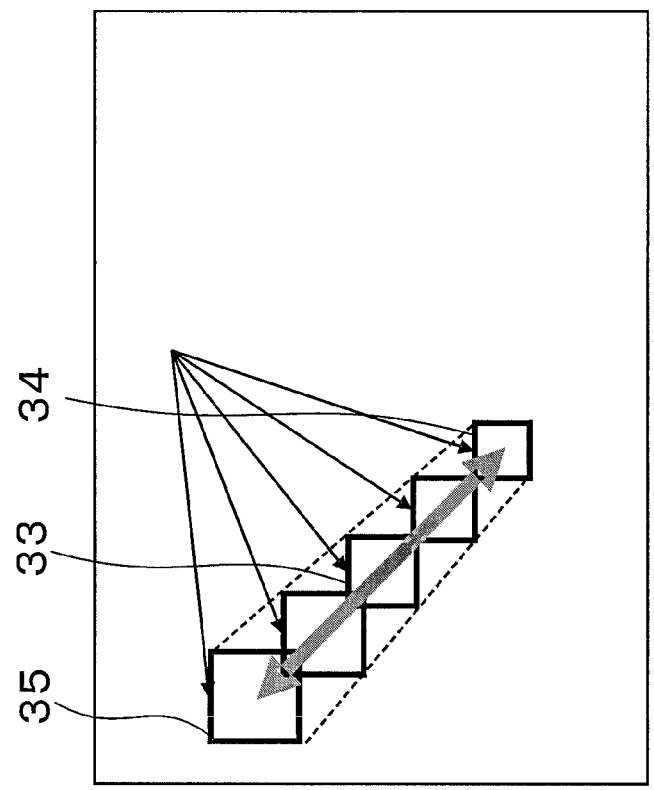

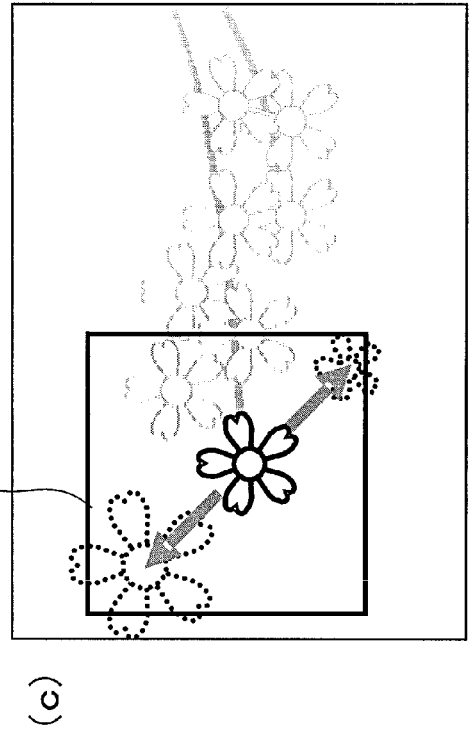
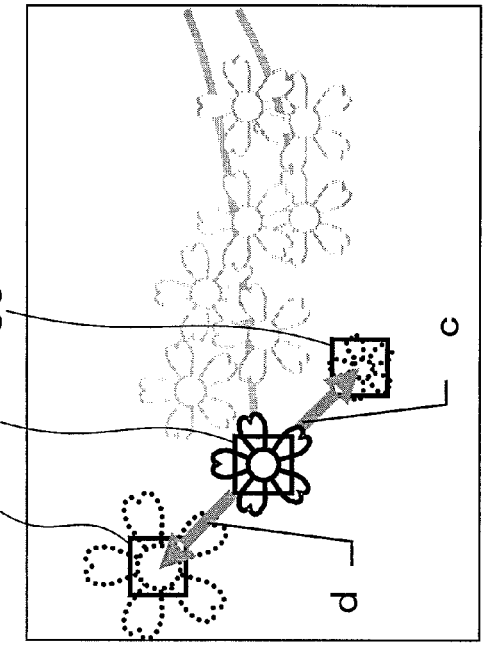
FIG. 8A
FIG. 8C
FIG. 8B

FOCUS ADJUSTMENT UNIT AND CAMERA SYSTEM

Benefit is claimed, under 35 U.S.C. §119, to the filing date of prior Japanese Patent Application No. 2013-007796 filed on Jan. 18, 2013. This application is expressly incorporated herein by reference. The scope of the present invention is not limited to any requirements of the specific embodiments described in the application.

BACKGROUND OF THE INVENTION

1. Field of the Invention

The present invention relates to a focus adjustment unit and a camera system that set a focus detection area within an imaging area and performs focus adjustment based on a focus detection signal in the focus detection area.

2. Description of Related Art

AF (Auto Focus) is known generally, which brings a subject into focus by adjusting the position of a focusing lens using an image signal from an image sensor at the time of imaging. For example, focus detection is performed on an AF area fixed within the imaging area and the position of the focusing lens is adjusted based on this focus detection information.

In such a focus adjustment method, the size of a subject image changes in accordance with zooming of a zoom lens and the subject image corresponding to the AF area changes, and therefore, there may occur a problem that focus adjustment accuracy is decreased. To address such a problem, in the lens control unit disclosed in Japanese Unexamined Patent Publication No. 2005-025118, the AF area is scaled in accordance with an image magnification change due to zooming so that the AF area corresponding to the subject is fixed apparently at all the times.

SUMMARY OF THE INVENTION

An object of the present invention is to provide a focus adjustment unit and a camera system that enable focus adjustment with high accuracy by setting a focus detection area in accordance with an image magnification change due to the movement of a focusing lens at the time of focus adjustment.

The focus adjustment unit according to the present invention is a focus adjustment unit having an imaging section configured to generate an image signal by forming and capturing an optical image on an image sensor by an optical system including a focusing lens, for performing focus adjustment based on a focus detection signal relating to a focus detection area set within an imaging area, the focus adjustment unit comprising: a focusing lens position detection section configured to detect a position of the focusing lens; a storage section configured to store information on an image magnification change of the optical system along with the movement of the focusing lens; and a focus detection area setting section configured to set a focus detection area within the imaging area, wherein the focus detection area setting section sets the focus detection area based on the position of the focusing lens and the information on an image magnification change.

The focus adjustment unit according to the present invention is a focus adjustment unit having an imaging section configured to generate an image signal by forming and capturing an optical image on an image sensor by an optical system including a focusing lens, for performing focus adjustment based on a focus detection signal relating to a focus detection area set within an imaging area, the focus adjustment unit comprising: a focus detection area setting section configured to set a focus detection area within the imaging area; and a tracking section configured to track a subject image based on an image signal of the imaging section, wherein the tracking section tracks a subject image located in the focus adjustment area in accordance with the movement of the focusing lens, and the focus detection area setting section sets a focus detection area based on a tracking result of the tracking section.

The camera system according to the present invention is a camera system including an interchangeable lens having an optical system including a focusing lens and a camera main body section to and from which the interchangeable lens can be attached and detached, wherein the interchangeable lens includes: a focusing lens position detection section configured to detect a position of the focusing lens; and a storage section configured to store information on an image magnification change of the optical system along with the movement of the focusing lens, wherein the camera main body section includes: an imaging section configured to generate an image signal of an imaging area by forming and capturing an optical image on an image sensor by the optical system; a focus detection area setting section configured to set a focus detection area within the imaging area; and a focus adjustment section configured to perform focus adjustment based on a focus detection signal calculated from the image signal within the focus detection area, and wherein the focus detection area setting section sets the focus detection area based on the position of the focusing lens output from the focusing lens position detection section and the information on an image magnification change output from the storage section.

The control method according to the present invention is a control method of a focus adjustment unit having an imaging section configured to generate an image signal within an imaging area by forming and capturing an optical image on an image sensor by an optical system including a focusing lens, and a storage section configured to store information on an image magnification change of the optical system along with movement of the focusing lens, for performing focus adjustment based on a focus detection signal relating to a focus detection area set within the imaging area, the control method comprising the steps of: setting a second focus detection area by changing a first focus detection area specified in advance based on a position of the focusing lens and the information on an image magnification change in accordance with the movement of the focusing lens; and performing focus adjustment based on a focus detection signal relating to the second focus detection area.

BRIEF DESCRIPTION OF THE DRAWINGS

FIG. 4A and FIG. 4B are each a diagram for explaining a relationship between a focusing lens and an image formation position on an imaging surface in the camera according to the embodiment of the present invention.

FIG. 5 is a diagram for explaining AF area movement due to an image magnification change in the camera according to the embodiment of the present invention.

FIG. 6A and FIG. 6B are each a diagram showing the position of an AF area in the camera according to the embodiment of the present invention.

FIG. 7A and FIG. 7B are each a diagram for explaining estimation of an image movement amount and movement of the AF area when there is image magnification information in the camera according to the embodiment of the present invention.

FIG. 8A to FIG. 8C are each a diagram for explaining correction of the AF area when there is no image magnification information in the camera according to the embodiment of the present invention.

DETAILED DESCRIPTION OF THE PREFERRED EMBODIMENTS

Hereinafter, preferred embodiments are explained in accordance with drawings using a camera to which the present invention is applied. The camera according to a preferred embodiment of the present invention is a digital camera. The camera has an imaging section configured to generate an image signal based on an optical image by forming an optical image formed by an optical system on an image sensor. Then, based on a focus detection signal relating to a focus detection area set within an imaging area, the camera acquires image signals from the imaging section while moving the optical system from the infinity to the near side or from the near side to the infinity side and performs focus adjustment of the optical system based on the image signals by the mountain climbing servo (contrast AF) system. In the case where image magnification change information of the optical system can be acquired, it is possible to change the focus detection area in accordance with the change in the position of the focusing lens of the optical system using the image magnification change information.

Figure 1:
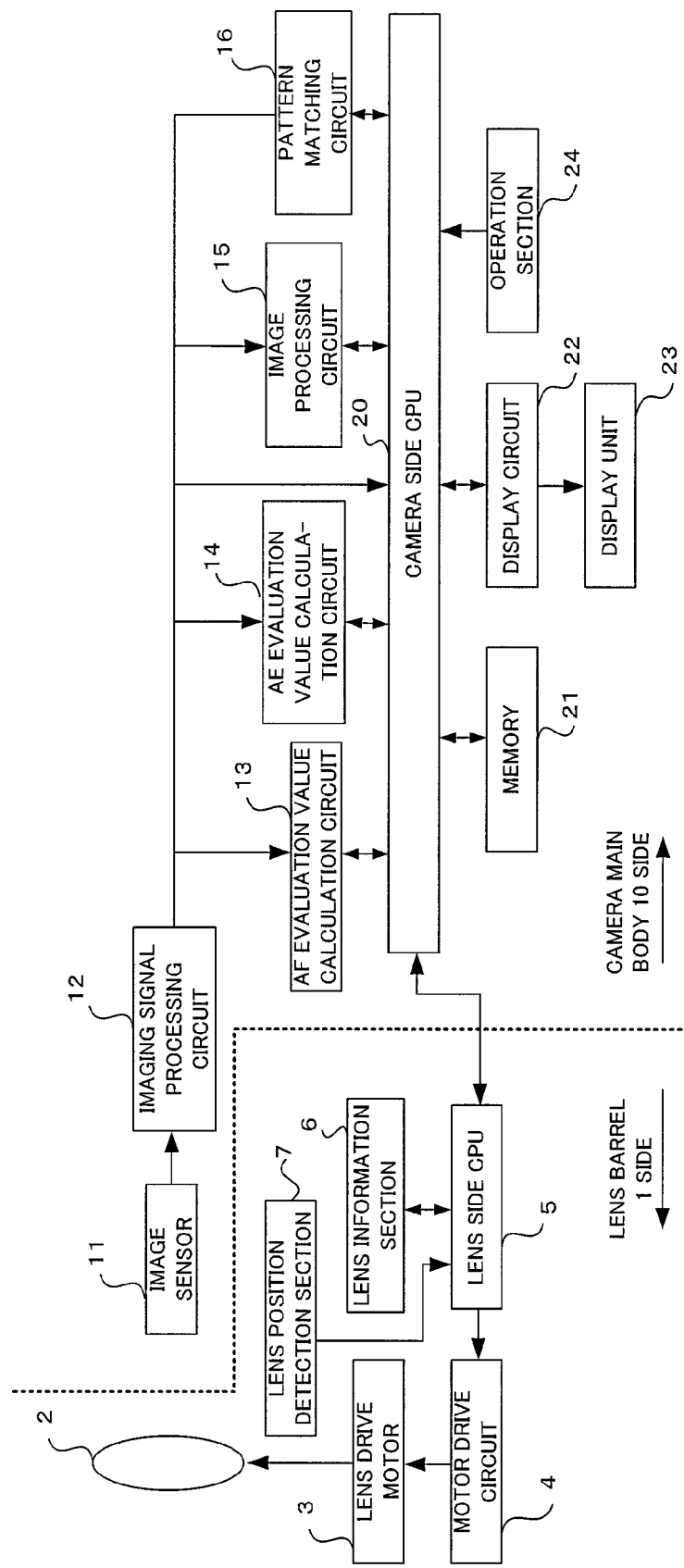
FIG. 1 is a block diagram mainly showing an electrical configuration of a camera according to an embodiment of the present invention.

FIG. 1 is a block diagram mainly showing an electrical configuration of the camera according to the embodiment of the present invention. The camera according to the present embodiment includes a lens barrel 1 and a camera main body 10. It may also be possible to configure the lens barrel 1 and the camera main body 10 separately or of course to configure them integrally as a general compact camera.

The lens barrel 1 internally has a photographing lens 2, a lens drive motor 3, a motor drive circuit 4, a lens side CPU 5, a lens information section 6, and a lens position detection section 7.

The photographing lens 2 includes a focusing lens and includes a plurality of optical lenses for forming an optical image of a subject, and is a single-focusing lens or a zoom lens. The focusing lens of the photographing lens 2 is driven by the lens drive motor 3 in the optical axis direction of the photographing lens 2. The lens drive motor 3 is connected to the motor drive circuit 4 and performs drive control of the lens drive motor 3 in accordance with a control signal from the lens side CPU 5.

The lens information section 6 stores various kinds of data of the lens barrel 1, for example, focal length information on the short-focal length side, focal length information on the long-focal length side, currently set focal length information, aperture information, optical characteristics information of the photographing lens, adjustment value information, etc. As the optical characteristics information, image magnification change rate information is stored. The image magnification change rate information is information on the image magnification change of the optical system along with the movement of the focusing lens. Further, the image magnification differs depending on the image height position from the center of the lens, and therefore, as the image magnification change rate information, information in accordance with the image height position is also included. The lens information section 6 is connected with the lens side CPU 5 and outputs lens information in response to a request from the lens side CPU 5.

The lens position detection section 7 detects the position of a focusing lens 2a (see FIGS. 4A and 4B) of the photographing optical system 2. As the method for detecting the position of a focusing lens, for example, it may also be possible to detect the position by an absolute value encoder following the movement of the focusing lens, or to detect the position by a reference position detection section and an encoder for detecting a relative position. In the case where the lens drive motor 3 is a stepping motor, it may also be possible to detect the number of pulses input to the stepping motor. In the case where the number of input pulses is detected, the lens side CPU 5 plays a role of the function of the lens position detection section.

The lens side CPU 5 performs control of the whole within the lens barrel 1. In particular, the lens side CPU 5 receives a lens control signal from a camera side CPU 20 and performs focusing of the focusing lens by the motor drive circuit 4 and the lens drive motor 3. Further, the lens side CPU 5 outputs various kinds of information stored in the lens information section 6 and information on the focusing lens position detected by the lens position detection section 7 to the camera side CPU 20.

The camera main body 10 has an image sensor 11, an imaging signal processing circuit 12, an AF evaluation value calculation circuit 13, an AE evaluation value calculation circuit 14, an image processing circuit 15, a pattern matching circuit 16, and the camera side CPU 20 which are connected to the imaging signal processing circuit 12, a memory 21, an operation section 24, and a display circuit 22 which are connected to the camera side CPU 20, and a display unit 23 connected to the display circuit 22, etc.

The image sensor 11 is arranged in a position on the optical axis of the photographing lens 2 and where an optical image of a subject is formed. The image sensor 11 captures an image of an optical image formed by the photographing lens 1. In the image sensor 11, photodiodes configuring each pixel are arranged two-dimensionally in the form of a matrix and each photodiode generates a photoelectric conversion current in accordance with the quantity of received light and the photoelectric conversion current is accumulated as charges by a capacitor connected to each photodiode.

The imaging signal processing circuit 12 performs charge accumulation control, image signal read control, etc., of the image sensor 11. The imaging signal processing circuit 12 repeatedly reads image signals from the image sensor 11 and the read image signals (also referred to as image data) are output to the AF evaluation value calculation circuit 13, the AE evaluation value calculation circuit 14, the image processing circuit 15, the pattern matching circuit 16, and the camera side CPU 20.

The AF evaluation value calculation circuit 13 calculates an AF evaluation value (contrast value) by extracting a high-frequency component from image data each time the image data is output from the imaging signal processing circuit 12 and outputs the AF evaluation value to the camera side CPU 20. It is possible to calculate an AF evaluation value from, for example, a brightness difference etc. between neighboring pixels. The calculation of the AF evaluation value is performed for each predetermined focus detection area (also referred to as an AF area). The predetermined focus detection area is configured by a plurality of pixels.

The AE evaluation value calculation circuit 14 calculates an AE evaluation value in accordance with subject luminance based on image data from the imaging signal processing circuit 12 and outputs the AE evaluation value to the camera side CPU 20.

The image processing circuit 15 performs image processing, such as tone correction, white balance correction, noise reduction correction, edge enhancement correction, shading correction, and an aberration correction arithmetic operation based on aberration information of a photographing lens, on the image data processed by the imaging signal processing circuit 12. Further, the image processing circuit 15 performs image processing for a live view display. Furthermore, the image processing circuit 15 also performs image data compression processing so that still images and moving images are caused to have a predetermined record format.

The pattern matching circuit 16 performs pattern matching processing for subject tracking using the image data processed by the imaging signal processing circuit 12. That is, image data is output for each frame from the image sensor 11, and therefore, if the subject tracking mode is set, the position to which the tracking target has moved is detected by comparing the image data in the previous frame and that in the current frame. By using a plurality of pieces of image data, it is possible to follow the tracking target at all times, and to enable auto focus adjustment so that the tracking target is always in focus.

The memory 21 is an electrically rewritable nonvolatile memory, such as a flash ROM, and stores programs executed by the camera side CPU 20, various kinds of adjustment values, etc. The memory 21 also includes a volatile memory, such as a DRAM and an SDRAM, and it is used to temporarily store various kinds of data, such as image data and control instructions.

The display circuit 22 receives image data from the camera side CPU 20 and performs control of an image display in the display unit 23. The display unit 23 has a display monitor, such as TFT (Thin Film Transistor) liquid crystal and organic EL, and is arranged at the back etc. of the body of the camera main body 10. Further, as the display unit 23, it may also be possible to provide an electronic viewfinder (EVF) configured to produce a display via an eyepiece section. The display unit 23 produces a live view display at the time of photographing, a reproduced display of photographed image data, a display of a menu screen etc. for setting photographing conditions, etc.

The operation section 24 includes various kinds of operating members provided in the camera and detects the operating state of the various kinds of operating members and then transmits a detection signal to the camera side CPU 20. As the various kinds of operating members, the operation section 24 has a power source button, a release button, a moving image button, a menu button, a cross button, an OK button, a reproduction button, etc.

The release button within the operation section 24 has a two-step switch including a 1st release switch and a 2nd release switch. When the release switch is half-pressed, the 1st release switch turns on and when pressed further from the half-pressed state, that is, when fully pressed, the 2nd release switch turns on. When the 1st release switch turns on, the camera side CPU 20 performs a photographing preparation sequence, such as AE processing and AF processing. When the 2nd release switch turns on, the camera side CPU 20 performs a photographing sequence and performs photographing.

The camera side CPU 20 controls the whole of the camera and controls each section based on the detection signal from the operation section 24 and signals from other circuits in accordance with programs stored in the memory 21.

The camera side CPU 20 has a function as a focus detection area setting section configured to set a focus detection area within the imaging area. The focus detection area setting section changes the focus detection area based on the position of the focusing lens 2a and information on the image magnification change stored in the lens information section 6. The change of the focus detection area is described later using step S9 in FIG. 2 and FIG. 3. Further, it may also be possible for a photographer to set the focus detection area (AF area) in advance, or to automatically set the focus detection area in the position of a face etc. detected by the image processing circuit 15.

The camera side CPU 20 functions as a tracking section configured to track a subject image based on the image signal of the imaging section in cooperation with the pattern matching circuit 16. In the case where the position of the focus detection area is greater than a predetermined image height position, the tracking section tracks a subject image located in the focus adjustment area in accordance with the movement of the focusing lens. At this time, the focus detection area setting section described above sets a focus detection area based on the tracking result of the tracking section. Further, the tracking section performs the tracking operation by performing pattern matching processing on a plurality of image signals output by the imaging section. The subject tracking in accordance with the movement of the focusing lens is described later using step S13 in FIG. 2 and FIG. 8B.

In the present embodiment, the tracking section, which functions in cooperation with the camera side CPU 20 and the pattern matching circuit 16, changes the size of the focus detection area in the case where the tracking operation cannot be performed. The size change of the focus detection area is described later using step S15 in FIG. 2 and FIG. 8C.

Figure 2:
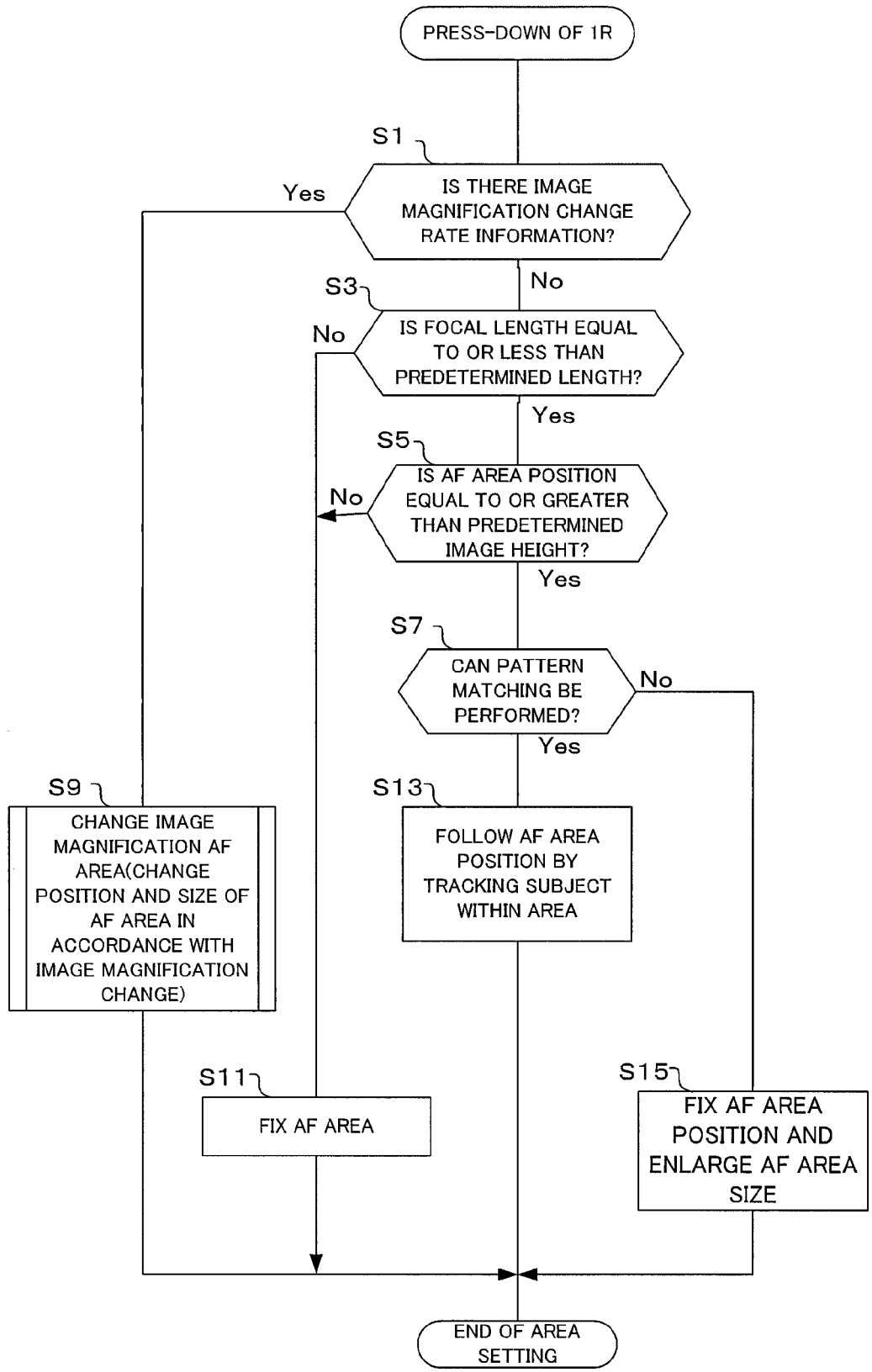
FIG. 2 is a flowchart showing the operation when 1R of the camera according to the embodiment of the present invention is pressed down.
Figure 3:
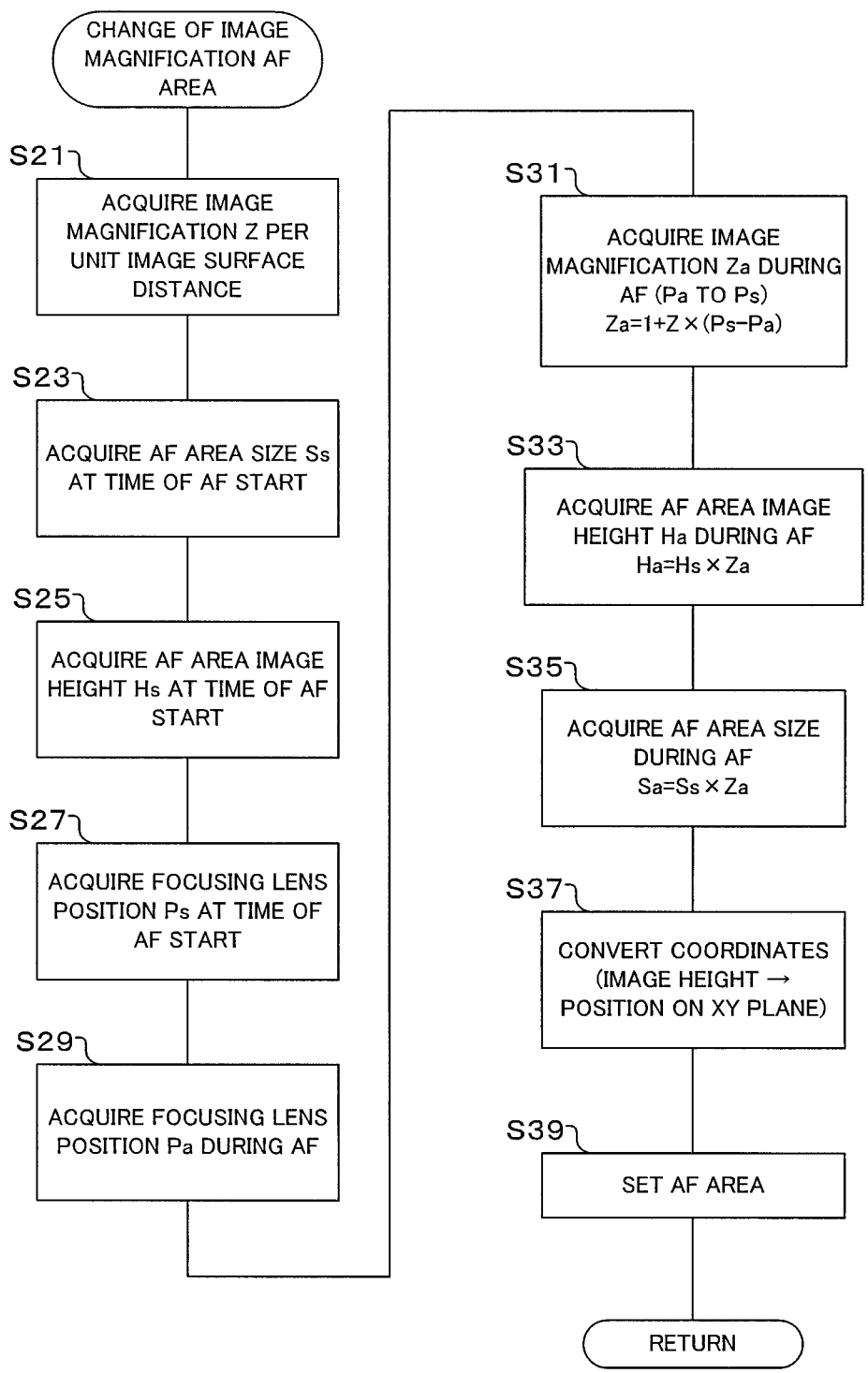
FIG. 3 is a flowchart showing the operation to change an image magnification AF area of the camera according to the embodiment of the present invention.

Next, the operation of the AF area setting of the camera according to the embodiment of the present invention is explained using the flowcharts shown in FIG. 2 and FIG. 3. These flowcharts are executed by the camera side CPU 20 in accordance with programs stored in the memory 21.

When the release button of the operation section 24 is operated and the 1st release switch turns on, the flowchart of press-down of 1R shown in FIG. 2 starts. First, whether or not there is image magnification change rate information is determined (S1). When the lens barrel 1 is of the interchangeable lens type, there are a case where the lens information section 6 of the lens barrel 1 has image magnification change rate information and a case where not. Because of this, whether or not image magnification change rate information is available is determined at this step. In the case where the lens barrel 1 is configured integrally with the camera main body 10 and there is image magnification change rate information, it suffices that only step S9 to be described later is performed.

According to the determination result at step S1, when there is image magnification change rate information, the AF area is changed in accordance with the image magnification (S9). Here, the position and size of the AF area are changed in accordance with the image magnification. It may also be possible at first for a photographer to set the AF area in advance, or to automatically set the AF area in a position of a face etc. detected by the image processing circuit 15. When the 1st release switch turns on, the mountain climbing servo AF is performed and at this time, the scan operation of the focusing lens is performed for AF, and therefore, the image magnification changes. Because of this, at step S9, in accordance with the change rate of the image magnification, the position and size of the AF area set at first are changed. The operation to change the AF area in accordance with the image magnification is described later using FIG. 3.

According to the determination result at step S1, when there is no image magnification change rate information, whether or not the focal length is equal to or less than a predetermined length is determined (S3). In general, the change in the image magnification appears considerably large on the short-focal length side, and conversely on the long-focal length side, the change in the image magnification is small. Because of this, on the long-focal length side, even if the focusing lens moves, it is not necessary to move the AF area. At this step S3, information of the currently set focal length is input from the lens side CPU 5 and determination is performed. Further, it is only required for the predetermined value used for determination to be about the focal length by which it is possible to determine whether or not the AF area needs to be changed due to the movement of the focusing lens.

According to the determination result at step S3, when the focal length is equal to or less than the predetermined length, whether or not the AF area position is equal to or greater than a predetermined image height is determined (S5). In general, the change in the image magnification is large in the area where the image height is great and in the area where the image height is small, the change in the image magnification is small. Because of this, in the area where the image height is small, even if the focusing lens moves, it is not necessary to move the AF area. At this step, determination is performed based on the image height in the center position of the AF area currently set. The image height is the distance from the optical axis center of the photographing lens 2 to the center position of the AF area.

According to the determination result at step S3, when the focal length is not equal to or less than the predetermined length, or according to the determination result at step S5, when the AF area position is equal to or greater than the predetermined image height, the AF area is fixed (S11). As described previously, when performing step S11, the state is such that the change in the image magnification is small and the necessity is slight to change the AF area in accordance with the movement of the focusing lens. Because of this, the AF area currently set is fixed, not changed.

According to the determination result at step S5, when the AF area position is equal to or greater than the predetermined image height, whether or not pattern matching can be performed is determined (S7). In the case where the subject tracking mode is set, the pattern matching circuit 16 detects the position of the tracking target, and therefore, the camera side CPU 20 performs automatic focus adjustment so that the position is brought into focus. At this step S7, the subject tracking mode is set and by the pattern matching circuit 16, whether or not pattern matching of the tracking target can be performed is determined.

According to the determination result at step S7, when pattern matching can be performed, the AF area position is caused to follow by tracking the subject within the area (within imaging area) (S13). At this step, pattern matching can be performed, and therefore, the AF area is moved in accordance with the position of the subject to be followed.

According to the determination result at step S7, when pattern matching cannot be performed, the AF area position is fixed and the AF area size is increased (S15). At this step, the AF area size is increased without changing the position of the AF area initially set. Because of this, even if the position of the subject corresponding to the initial AF area moves due to the change in the image magnification along with the movement of the focusing lens, the AF area size is already increased, and therefore, the subject corresponding to the initial AF area is still included.

When the AF area position is set at steps S9 to S15, this flow is exited.

Prior to explaining the flow to change the image magnification AF area, the change of the AF area in accordance with the movement of the focusing lens is explained using FIG. 4A, FIG. 4B, and FIG. 5. FIG. 4A shows the position (reference position) of the focusing lens 2a at the time of AF start and FIG. 4B shows the position of the focusing lens 2a during the AF operation. When the focusing lens 2a is located in a reference position Ps, the image of a subject A is formed in a position at an image height Hs on an imaging surface B as shown in FIG. 4A. Further, in the case where the focusing lens is moved during the AF operation and the focusing lens 2a is located in Pa as shown in FIG. 4B, the image of the subject A is formed in a position at an image height Ha on the imaging surface B.

FIG. 5 shows the movement of the AF area on the imaging surface of the image sensor 11. An AF area 31 shows a position of the AF area at the time of AF start and the AF area 31 is in a position at the image height Hs from an optical axis center O of the photographing lens 2 and has an area size Ss. An AF area 32 shows a position of the AF area in the position to which the focusing lens 2a has moved during the AF operation, and the AF area 32 is in the position at the image height Ha from the optical axis center O and has an area size Sa. By the movement of the focusing lens 2a, the AF area has moved an amount of AF area movement L due to the image magnification change.

Next, by using the flowchart shown in FIG. 3, the detailed operation to change the image magnification AF area at step S9 is explained. In the flow to change the image magnification AF area, the position and size of the AF area are changed in accordance with the image magnification using the image magnification in accordance with the position of the focusing lens.

When the flow to change the image magnification AF area is entered, first, an image magnification Z per unit image surface distance is acquired (S21). The image magnification Z per image surface distance is stored in the lens information section 6, and therefore, this image magnification Z is acquired.

After the image magnification Z is acquired, next, the AF area size Ss at the time of AF start is acquired (S23). Here, the 1st release switch turns on and the AF area size Ss when the AF operation is started (see FIG. 5) is acquired. It is only required to store the AF area size Ss in the memory 21 when the AF operation starts.

After the AF area size Ss at the time of AF start is acquired, next, the AF area image height Hs at the time of AF start is acquired (S25). Here, based on the position of the AF area when the AF operation is started, the image height Hs of the AF area (see FIG. 5) is acquired. It may also be possible to store the image height Hs in advance in a table in accordance with the position of the AF area and then to find the image height Hs by referring to the table, or to find by an arithmetic operation of the x coordinate and the y coordinate of the AF area.

After the AF area image height Hs at the time of AF start is acquired, next, the focusing lens position Ps at the time of AF start is acquired (S27). Here, the focusing lens position Ps shown in FIG. 4A is acquired by the lens position detection section 7. It is only required to store the focusing lens position Ps in the memory 21 when the AF operation starts.

After the focusing lens position Ps at the time of AF start is acquired, next, the focusing lens position Pa during AF is acquired (S29). Here, after the AF operation starts, the focusing lens position Pa shown in FIG. 4B is acquired by the lens position detection section 7.

After the focusing lens position Pa during AF is acquired, next, an image magnification Za (Pa to Ps) during AF is calculated (S31). Here, the image magnification Za during AF is calculated by expression (1) below using the image magnification Z acquired at step S21, the focusing lens position Ps at the time of AF start acquired at step S27, and the focusing lens position Pa during AF acquired at step S29.

$$Za=1+Z\times(Ps-Pa) \quad (1)$$

After the image magnification Za during AF is calculated, next, the AF area image height Ha during AF is calculated (S33). Here, the AF area image height Ha during AF is calculated by expression (2) below using the AF area image height Hs at the time of AF start acquired at step S25 and the image magnification Za calculated at step S31.

$$Ha=Hs\times Za \quad (2)$$

After the AF area image height Ha during AF is calculated, next, the AF area size Sa during AF is calculated (S35). Here, the AF area size Sa during AF is calculated by expression (3) below using the AF area size Ss at the time of AF start acquired at step S23 and the image magnification Za calculated at step S31.

$$Sa=Ss\times Za \quad (3)$$

After the AF area size Sa during AF is calculated, next, coordinate conversion is carried out (S37). Here, at step S33, the calculated AF area image height Ha is converted into coordinates of the position on the XY plane. That is, the coordinates of the position on the XY plane of the already-known AF area at the time of AF start are converted into coordinates of the position on the XY plane of the AF area image height Ha using the ratio between the AF area image height Ha and the AF area image height Hs at the time of AF start (see FIG. 5). Further, in accordance with the AF area size Sa calculated at step S35, conversion into the position at the outer edge of the AF area (coordinates of the four corners of the rectangle) is carried out.

After the coordinate conversion is carried out, next, the setting of the AF area is performed (S39). Here, the setting of the AF area is performed using the result of the coordinate conversion carried out at step S37. That is, the new AF area 32 is set as shown in FIG. 5 described previously. After the setting of the AF area is performed, the procedure returns to the original flow.

As described above, in the flow to change the image magnification AF area, the position of the AF area (focus detection area) is changed and in particular, the position is changed to a position in accordance with the image magnification. That is, information on the image magnification change (image magnification Z) of the optical system along with the movement of the focusing lens 2a is acquired (S21), position information of the positions Ps and Pa of the focusing lens is acquired (S27 and S29), then using these pieces of information, the image magnification Za during AF is calculated (S31). Then, by using this image magnification Za, the AF area image height Ha during AF is calculated (S33) and the position of the new AF area is set using the image height Za (S37 and S39).

In the flow to change the image magnification AF area, the size of the AF area (focus detection area) is changed and in particular, the size is changed to a size in accordance with the image magnification. That is, the AF area size Sa during AF is calculated (S35) using the image magnification Za calculated at step S31 and the size of the new AF area is set using the AF area size Sa (S37, S39).

In the flow to change the image magnification AF area in the present embodiment, the position and size of the new AF area are changed, but, in the case where only one of them is sufficient as the AF area, it may also be possible not to change both the position and the size.

Next, using FIG. 6A and FIG. 6B, the change of the AF area using the image magnification change rate in the present embodiment is explained. FIG. 6A shows the entire composition of a subject image displayed on the imaging surface of the image sensor 11 or on the display unit 23. FIG. 6B is an enlarged view of the portion surrounded by the dotted line in the top-left corner in FIG. 6A. In this example, an AF area 33 is brought into focus.

If the focusing lens 2a is driven in order to bring the AF area 33 in FIG. 6A into focus, the subject moves in the image height direction due to the change in the image magnification. That is, if the focusing lens 2a moves to the infinity side, the subject located in the AF area 33 moves in the direction of an arrow a in FIG. 6B. If the focusing lens 2a moves to the near side, the subject located in the AF area 33 moves in the direction of an arrow b in FIG. 6B.

As described above, if the focusing lens 2a moves for focusing, the subject initially located within the AF area also moves. At this time, if the AF area is not moved, a different subject is brought into focus and false focusing will result. Because of this, in the present embodiment, at step S9 in FIG. 2, the AF area is changed in accordance with the image magnification (see FIG. 3). Consequently, even if the focusing lens 2a moves, the AF area is set for the same subject.

FIGS. 7A and 7B show how the position and the area size of the AF area change. In FIG. 7A, when the focusing lens 2a moves to the infinity end, the AF area 33 moves to the position of an estimated AF area 34 at the infinity end and the size is also reduced as shown in FIG. 7A. When the focusing lens 2a moves to the near end, the AF area 33 moves to the position of an estimated AF area 35 at the near end and the size is also enlarged as shown in FIG. 7A.

In FIG. 7A, only the AF area 33 at the time of AF start, the AF area 34 at the infinity end, and the AF area 35 at the near end are shown. However, as shown in FIG. 7B, during the drive of the focusing lens 2a, each time image data corresponding to one frame is output from the image sensor 11, the AF area is set again by the flow to change the image magnification AF area shown in FIG. 3. The AF evaluation value calculation circuit 13 calculates an AF evaluation value (contrast value), finds the maximum value of the AF evaluation value, and determines the focus point using the image data of the AF area set again.

Next, using FIG. 8A to FIG. 8C, the change of the AF area in the case where there is no image magnification change information is explained. FIG. 8A shows an example in which whether or not to correct the AF area is determined according to the size of the image height. As explained in the determination at S5 in FIG. 2, the change in the image magnification is large in the area where the image height is great and in the area where the image height is small, the change in the image magnification is small. Because of this, within a predetermined image height range from the optical axis center O (inside the dotted line in FIG. 8A), the AF area is not corrected. Outside the predetermined image height range (outside the dotted line in FIG. 8A) from the optical axis center O, the AF area is corrected. As correction of the AF area, for example, there are methods as those at steps S13 and S15 in FIG. 2. In the example shown in FIG. 8A, the AF area 33 is outside the dotted line, and therefore, the AF area is corrected.

FIG. 8B shows an example in which the AF area is corrected by subject tracking. As explained at step S13 in FIG. 2, the AF area is moved in accordance with the position of the subject to be followed. In the example shown in FIG. 8B, AF areas 36 and 37 are moved in accordance with movement amounts c and d by subject tracking calculated by the pattern matching circuit 16.

FIG. 8C shows an example in which the subject is prevented from deviating from the AF area by enlarging the AF area. As explained at S15 in FIG. 2, the AF area size is increased without changing the position of the AF area. Even if the position of the AF area moves along with the movement of the focusing lens 2a, the subject is prevented from deviating from the AF area by increasing the size of an AF area 38.

As explained above, in the embodiment of the present embodiment, the focus detection area is set based on the position of the focusing lens and the information on the image magnification change (S33 and S39 in FIG. 3). Because of this, the focus detection area is set in accordance with the change in the image magnification due to the movement of the focusing lens at the time of focus adjustment and thus focus adjustment with high accuracy is enabled.

Further, in the embodiment of the present invention, in the case where the position of the focus detection area is greater than the predetermined image height position (S5 in FIG. 2), the subject image located in the focus adjustment area is tracked in accordance with the movement of the focusing lens and the focus detection area is set based on the tracking result (S13 in FIG. 2). Because of this, the focus detection area is set in accordance with the change in the image magnification due to the movement of the focusing lens at the time of focus adjustment and thus focus adjustment with high accuracy is enabled.

Conventionally, it is known that the image magnification changes also by the movement of the focusing lens. In the technique disclosed in Japanese Unexamined Patent Publication No. 2005-025118 described previously, the AF area is scaled in accordance with the change in the image magnification due to the zoom operation, but, the technique is not adapted to handle the change in the image magnification due to the movement of the focusing lens. Because of this, the subject image deviates from the AF area because of the image magnification change due to the movement of the focusing lens at the time of focus adjustment, and therefore, it is not possible to acquire correct AF information and the AF accuracy is reduced. In contrast to this, in the embodiment of the present invention, the focus detection area is set based on the position of the focusing lens and the information on the image magnification change, and therefore, it is possible to perform focus adjustment with high accuracy.

In the embodiment of the present invention, the mountain climbing servo system is explained as the system in which the focusing lens moves during the AF operation, but, the system is not limited to this and it is possible to apply the present invention to any AF system in which the focusing lens moves during the AF operation.

Further, in the embodiment of the present invention, even in the case where image magnification change rate information cannot be acquired, the AF area is corrected by various kinds of methods, but, it is not necessary to perform all the corrections of the AF area shown in FIG. 2 and it may be possible to perform part of the corrections or to add another correction.

In the present embodiment, explanation is given using the digital camera as a device for photographing, but, as the camera, a digital single-lens reflex camera, a mirrorless camera, and a compact digital camera may be used and further, a camera for moving images, such as a video camera and a movie camera, may be used, and furthermore, a camera incorporated in a mobile telephone, a smart telephone, a PDA (Personal Digital Assist), a gaming machine, etc., may be used. In any case, it is possible to apply the present invention to a device in which the focusing lens moves during the AF operation.

Also, regarding the operation flow in the patent claims, the specification and the drawings, for the sake of convenience description has been given using words representing sequence, such as "first" and "next", but at places where it is not particularly described, this does not mean that implementation must be in this order.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A focus adjustment unit having an imaging section configured to generate an image signal by forming and capturing an optical image on an image sensor by an optical system including a focusing lens, for performing focus adjustment based on a focus detection signal relating to a focus detection area set within an imaging area, the focus adjustment unit comprising:
   a focusing lens position detection section configured to detect a position of the focusing lens;
   a storage section configured to store information on an image magnification change of the optical system along with the movement of the focusing lens; and
   a focus detection area setting section configured to set a focus detection area within the imaging area, wherein
   the focus detection area setting section sets the focus detection area based on the position of the focusing lens and the information on an image magnification change, and
   the focus detection area setting section calculates an image height of the focus detection area, after the focusing lens is moved, based on the image magnification change in accordance with a change of the position of the focusing lens and an image height of the focus detection area before the focusing lens is moved, and sets the focus detection area based on the calculated image height.

2. The focus adjustment unit according to claim 1, wherein the focus detection area setting section changes the size of a focus detection area set in accordance with an image height of the focus detection area.

3. A focus adjustment unit having an imaging section configured to generate an image signal by forming and capturing an optical image on an image sensor by an optical system including an optical system including a focusing lens, for performing focus adjustment based on a focus detection signal relating to a focus detection area set within an imaging area, the focus adjustment unit comprising:
   a focus detection area setting selection configured to set a focus detection area within the imaging area; and
   a tracking section configured to track a subject image based on an image signal of the imaging section, wherein
   the tracking section tracks a subject image located in the focus adjustment area in accordance with the movement of the focusing lens, and
   the focus detection area setting section sets a focus detection area based on a tracking result of the tracking section when the position of the focus detection area is greater than a predetermined image height position, and does not change the focus detection area when the position of the focus detection area is smaller than the predetermined image height position.

4. The focus adjustment unit according to claim 3, wherein the tracking section performs a tracking operation by performing pattern matching processing on a plurality of image signals output by the imaging section.

5. The focus adjustment unit according to claim 3, wherein the focus detection area setting section changes the size of the focus detection area when the tracking operation by the tracking section cannot be performed.

6. The focus adjustment unit according to claim 3, wherein the optical system includes a zoom optical system, the focus adjustment unit has a focal length detection section configured to detect a focal length of the optical system, and
the focus detection area setting section sets a focus detection area based on the tracking result of the tracking section when the focal length is greater than a predetermined value.

7. A camera system including an interchangeable lens having an optical system including a focusing lens and a camera main body section to and from which the interchangeable lens can be attached and detached, wherein
the interchangeable lens includes:
a focusing lens position detection section configured to detect a position of the focusing lens; and
a storage section configured to store information on an image magnification change of the optical system along with the movement of the focusing lens, wherein
the camera main body section includes:
an imaging section configured to generate an image signal of an imaging area by forming and capturing an optical image on an image sensor by the optical system;
a focus detection area setting section configured to set a focus detection area within the imaging area; and
a focus adjustment section configured to perform focus adjustment based on a focus detection signal calculated from the image signal within the focus detection area, and wherein
the focus detection area setting section sets the focus detection area based on the position of the focusing lens output from the focusing lens position detection section and the information on an image magnification change output from the storage section, and
the focus detection area setting section calculates an image height of the focus detection area, after the focusing lens is moved, based on the image magnification change in accordance with a change of the position of the focusing lens and an image height of the focus detection area before the focusing lens is moved, and sets the focus detection area based on the calculated image height.

8. The camera system according to claim 7, wherein the focus detection area setting section changes the size of a focus detection area set in accordance with an image height of the focus detection area.

9. A control method of a focus adjustment unit having an imaging section configured to generate an image signal within an imaging area by forming and capturing an optical image on an image sensor by an optical system including a focusing lens, and a storage section configured to store information on an image magnification change of the optical system along with movement of the focusing lens, for performing focus adjustment based on a focus detection signal relating to a focus detection area set within the imaging area, the control method comprising the steps of:
setting a second focus detection area by changing a first focus detection area specified in advance based on a position of the focusing lens and the information on an image magnification change in accordance with the movement of the focusing lens; and
performing focus adjustment based on a focus detection signal relating to the second focus detection area,
wherein the act of setting the second focus detection area includes firstly calculating an image height of the focus detection area, after the focusing lens is moved, based on the image magnification change in accordance with a change of the position of the focusing lens and an image height of the focus detection area before the focusing lens is moved, and secondly setting the focus detection area based on the calculated image height.

10. The control method according to claim 9, further comprising the step of:
setting the second focus detection area by changing the size of the first focus detection area in accordance with an image height of the focus detection area specified in advance.

\* \* \* \* \*